United States Patent Office 2,771,679
Patented Nov. 27, 1956

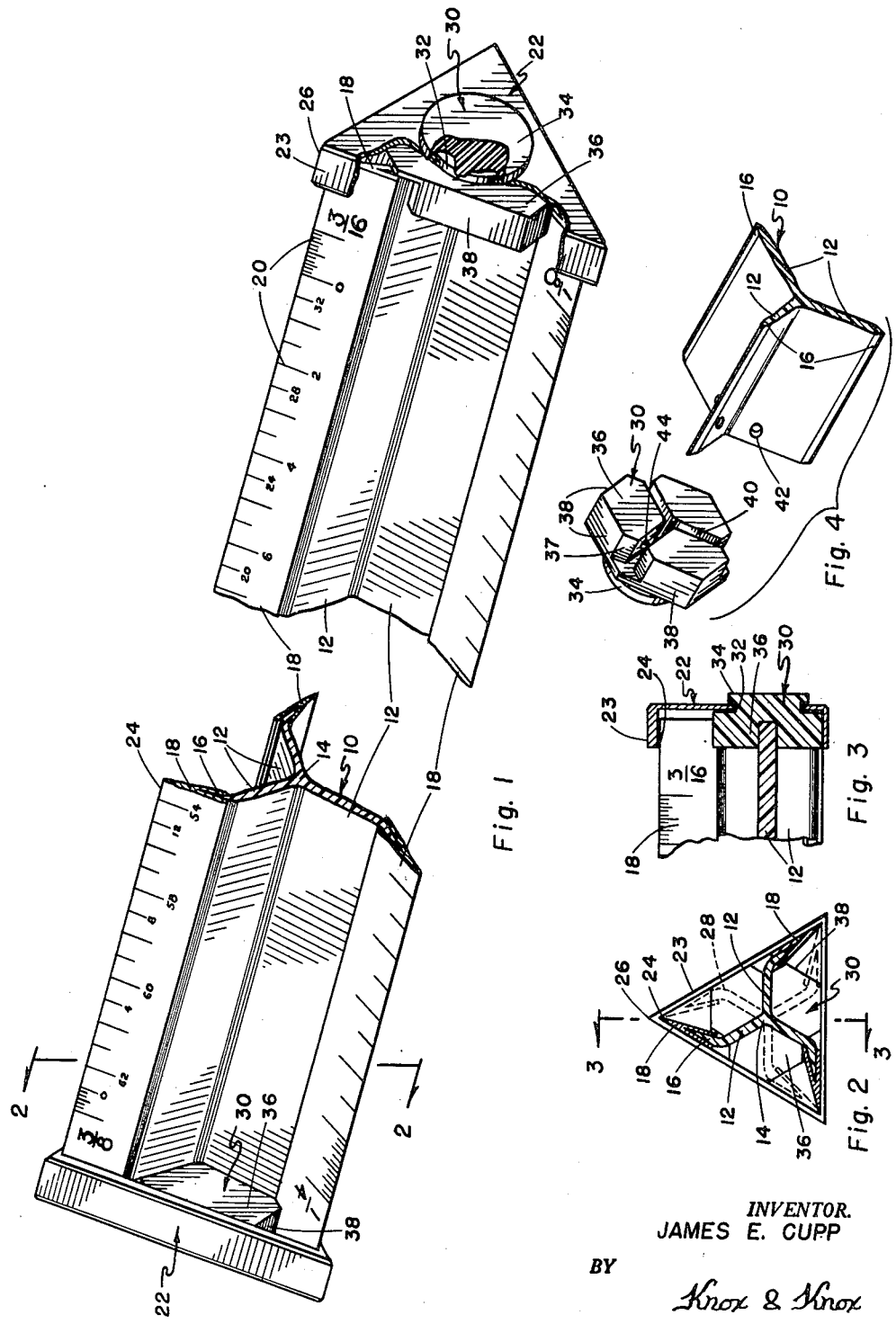

2,771,679

ENGINEER'S SCALE

James E. Cupp, San Diego, Calif.

Application March 30, 1956, Serial No. 575,162

4 Claims. (Cl. 33—107)

This invention relates generally to drafting instruments, and more particularly to a scale of the type generally referred to as engineer's scales, architect's scales, and various other special scales, all of which are elongated and of generally triangular form in cross-section.

A primary object of this invention is to provide such a scale with 6 scale faces which can each be made to lie almost flat upon the drafting surface, such as the regular drafting board, so that the engineer may read the calibrations on the scales face so disposed with increased facility, by reason of its being substantially flat on the drafting surface.

Another object of this invention is to provide a scale wherein related scale faces are all moved into easy reading position simultaneously. For example, 3 of the 6 faces on a scale may be calibrated in corresponding units, while the other 3 faces of the same instrument may be calibrated in other units, with the result that when the scale is adjusted for use with one type of unit the finer calibrations of the same type of units may be made available by merely rotating the scale through 60–120 degrees according to the usual practice in the employment of conventional scales of this character.

Another object of this invention is to provide a scale wherein scale faces are all disposable in substantially parallel relation to the drafting board without any disadvantageous features such as lack of rigidity in the scale, bulkiness, or the introduction of any unwanted mechanical elements which would interfer with the regular use of such an instrument.

Another object of this invention is to provide a scale of the general type mentioned above wherein end frames are secured to the ends of the scale body to extend slightly beyond the scaled faces, transversely of the elongated body of the scale, whereby the faces are spaced slightly from the surface whereon the scale is used, and whereby an accumulation of graphite or ink on the scaled faces is normally prevented from contacting and defacing a drawing during the use of the scale. In other words, the end frames, per se, function as spacers, although it will be understood that this is by no means the sole function of these end frames in the instant invention.

Another object of this invention is to provide an engineer's scale which is adapted for fabrication from many different materials, so that the choice of material can be according to the dictates of availability and price considerations, the exact sizes and proportions being matters easily determined to suit particular conditions and needs.

Another object of this invention is to provide an engineer's scale which is practicable and inexpensive to manufacture.

Finally, it is an object of this invention to provide an engineer's scale of the aforementioned character which is simple, safe and extremely convenient to use and which will give generally durable and efficient service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Figure 1 is a view, in perspective, of the assembled scale, the view being broken and foreshortened and portions being broken away for better disclosure of the underlying parts, some of these underlying parts being shown in section;

Figure 2 is a vertical sectional view taken substantially on the line 2—2 in Figure 1;

Figure 3 is a sectional view taken substantially on the line 3—3 in Figure 2, this figure being fragmentary in character and;

Figure 4 is a group view of the element hereinafter referred to as the retainer at one end of the scale, along with a fragmentary representation of the corresponding end of the scale body, the view being proposed as illustrating how the scale body fits into and is secured to the retainer.

Similar characters of reference indicate similar or identical elements and portions throughout the specification and throughout the drawing.

Referring now to the drawing in detail, this invention includes an elongated three-bladed scale body, generally indicated at 10, the individual blades 12 thereof extending from a longitudinal axial portion 14, and the angle between any two adjacent blades being approximately 120 degrees. Each blade 12 has a tapered edge portion 16 which is turned at a slight angle to the remaining portion of the blade 12 when the scale is assembled. It being understood that the scale body is constructed of flexible material which must also be very resilient and durable. Many of the present day plastic materials are suitable for this scale body.

Three scaled faces are rigidly secured to the tapered edge portions 16 of the blades by being clamped thereon, these scale faces 18 having calibrations on each side, as indicated at 20, it being understood that the scale faces are constructed of relatively inflexible material such as hard plastic or metal so that the flexing of the blades is limited to the main portion thereof, the tapered edge portions 16 being held rigidly and securely within the said scaled faces 18. Of course, the scaled faces and the blades are substantially coextensive in length, although they are of different materials, and although the scaled faces 18 may be thought of properly as constituting the tip portions of the blades.

A pair of opposed end frames are provided, each end frame being generally triangular and box-like and having sides 23 extending inwardly to cover the end portions of the scaled faces 18. The extremities 24 of the scaled faces must be continuously biased into engagement with the interior surface of the corner portions 26 defined by the said sides 23 of the end frames. To effect this the blades 12, including the scaled face 18 thereon has a width dimension slightly in excess of the distance from the longitudinal axis 14 to the inside surface of the corner portion 23 of the end frame, so that each blade must buckle as indicated in Figures 1 and 2. However, since the blades 12 are constructed of flexible and resilient material, they can be flexed into two alternative positions. This is done by the user of the instrument by manually pressing the blade until it snaps into the desired position. For example, the blade as disposed in full lines in Figure 2 may be snapped into the position indicated in dash line at 28 in the same figure, by lateral pressure applied to the surface of the blade at the left of the Figure 2.

It should be noted that the end frames constitute means to space the scaled faces from the drawing board, thus preventing graphite and ink accumulations on the scaled faces from soiling the drawing. The edges of the end frames are bevelled to prevent any tendency for the end frames to catch on any portion of the drawing paper or drawing board.

The end frames 22 must be held on the ends of the scale body 10 and this is accomplished by elements hereinafter referred to generally as retainers 30. Each retainer 30 constitutes a neck portion 32 which is engaged in a circular aperture in the corresponding end frame 22, a head 34 being provided outwardly of this journal or neck portion 32, and the remainder of each retainer will be referred to as a locking block 36.

Each locking block 36 is generally hexagonal in shape with beveled corners 37 and flats 38, which may be considered merely the sides of the hexagon defined by the block 36, these flats engaging the internal surfaces of the sides 23 of the end frame at the corresponding end of the scale body. The locking blocks 36 are constructed of flexible and resilient material so that they can be oscillated through approximately 60 degrees to bring another face of the hexagon into contact with the sides 23. There are two such locking blocks and they are rigidly secured to the ends of the scale body so that the buckling of all three blades 12 is accomplished in unison, the beveled corners 37 facilitating the partial rotation of the locking blocks within the end frames and pressing firmly against the scaled faces.

To secure a firm bonding of the locking blocks on the ends of the scale body, the blocks 36 are provided with channels 40 and the ends of the blade body are provided with deformations 42. The ends of the blades in the scale body fit into these channels 40 and the deformations aid in molding corresponding deformations in the locking blocks, one of which is indicated at 44, to hold the blades firmly in the channels. Obviously, other means may be provided for securing firm engagement of the locking blocks on the scale body.

In operation, the scale will be used generally in the manner of a conventional engineer's scale. However, the scaled faces will be disposed in substantial parallelism with the drafting board and the calibrations thereon will be much more easily read than the calibrations in such conventional scale. As explained in one of the objects in the foregoing specification, the calibrations 20 will ordinarily be in sets of three, and when the scale body is snapped into one of the two alternative positions, each of the related sets of calibrations will be readily available to the user. Of course, the principal function of the locking blocks 36 is to assure that all three scale faces are snapped into corresponding positions at the same time. It is important to note, however, that the invention can be partially reduced to practice by provision of a scale body, end frames, as detailed above, and suitable retainers without the use of the locking blocks 36, since the blades can be individually snapped from one position to the other, but it is preferable that all the blades be snapped in unison and the locking blocks 36 perform this function. Since the retainers 30 must be somewhat flexible, it is preferable that in snapping the scale body from one position to the other, the retainer should be grasped between the thumb and index finger of the hand so that a good grip can be attained to assure that the retainer will not be unduly deformed at one side. It is also preferable that both hands be used and both retainers grasped and moved together.

It is understood that minor variations from the form of the invention disclosed herein may be made without departure from the spirit and scope of the invention and that the specification and drawing are to be considered as merely illustrative rather than limiting.

I claim:

1. An engineer's scale comprising an elongated scale body of flexible and resilient material and comprising three symmetrically spaced, similar, coextensive blades radiating from the longitudinal axis of the body; said blades having substantially inflexible scaled faces constituting the elongated tip portions of the blades; triangular box-like end frames enclosing the ends of said body; and retainers secured to the ends of said body and retaining said end frames against movement longitudinally of said body; the extremities of said faces engaging the corners of said end frames; the width of said blades measured radially of the body being slightly greater than the distance from the center of one of said end frames to a corner thereof; whereby said faces can be snapped into two alternate positions, and in each position being substantially parallel to the corresponding sides of the end frames.

2. An engineer's scale according to claim 1 wherein said end frames have sides extending over the ends of said scale faces; at least one of said retainers including a block disposed within said sides; said block having a plurality of flats, one at each side of each blade, and said flats selectively engaging the adjacent sides of the corresponding end frame; according to which position the corresponding scaled face is snapped into; whereby the blades are locked in adjusted position; said block being sufficiently deformable and resilient to allow oscillation thereof in the end frame through 60 degrees, and said retainers oscillating as units, whereby all of the blades are snapped in unison when sufficient lateral pressure is applied on any one blade.

3. An engineer's scale according to claim 2 wherein said block has radiating channels therein and the ends of said scale body are fixed in said channels.

4. An engineer's scale according to claim 3 wherein the ends of the blades have deformations in those portions thereof contacted by said blocks, whereby the bonding of said blades to the retainers is assured.

References Cited in the file of this patent

UNITED STATES PATENTS

| | | |
|---|---|---|
| 857,416 | Schwartz | June 18, 1907 |
| 2,124,550 | Evans | July 26, 1938 |
| 2,190,327 | Clerke | Feb. 13, 1940 |
| 2,322,248 | Miller | June 22, 1943 |